United States Patent
Hagemann et al.

(10) Patent No.: US 8,943,821 B2
(45) Date of Patent: Feb. 3, 2015

(54) WAVE POWER PLANT

(75) Inventors: Benjamin Hagemann, Gerlingen (DE); Nik Scharmann, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 13/519,781

(22) PCT Filed: Dec. 16, 2010

(86) PCT No.: PCT/EP2010/007656
§ 371 (c)(1),
(2), (4) Date: Oct. 10, 2012

(87) PCT Pub. No.: WO2011/079911
PCT Pub. Date: Jul. 7, 2011

(65) Prior Publication Data
US 2013/0031897 A1 Feb. 7, 2013

(30) Foreign Application Priority Data
Dec. 30, 2009 (DE) .......................... 10 2009 060 889

(51) Int. Cl.
*F03B 13/20* (2006.01)
*F03B 13/18* (2006.01)

(52) U.S. Cl.
CPC ............. *F03B 13/20* (2013.01); *F03B 13/1825* (2013.01); *F05B 2240/97* (2013.01); *Y02E 10/38* (2013.01)
USPC ............................................. 60/505; 60/496

(58) Field of Classification Search
USPC .................. 60/505, 496; 290/42, 53
See application file for complete search history.

(56) References Cited

U.S. PATENT DOCUMENTS

| | | | | |
|---|---|---|---|---|
| 4,256,971 A * | 3/1981 | Griffith | | 290/53 |
| 4,516,033 A * | 5/1985 | Olson | | 290/54 |
| 4,686,377 A * | 8/1987 | Gargos | | 290/53 |
| 4,843,249 A | 6/1989 | Bussiere | | |
| 6,982,498 B2 * | 1/2006 | Tharp | | 290/54 |
| 7,042,113 B2 * | 5/2006 | Aukon | | 290/54 |
| 7,140,180 B2 * | 11/2006 | Gerber et al. | | 60/496 |
| 8,593,004 B2 * | 11/2013 | Piccinini | | 290/42 |

(Continued)

FOREIGN PATENT DOCUMENTS

| DE | 100 31 310 A1 | 1/2001 |
|---|---|---|
| GB | 2 164 097 A | 3/1986 |

(Continued)

OTHER PUBLICATIONS

International Search Report corresponding to PCT Application No. PCT/EP2010/007656, mailed Nov. 11, 2011 (German and English language document) (7 pages).

*Primary Examiner* — Kenneth Bomberg
*Assistant Examiner* — Shafiq Mian
(74) *Attorney, Agent, or Firm* — Maginot, Moore & Beck LLP

(57) ABSTRACT

A wave power plant includes a platform and at least one coupling member. The at least one coupling member is mounted in such a way as to perform an orbital movement which has a predetermined direction of movement and from which a torque usable for energy conversion can be tapped. A torque compensation device is provided which is designed to essentially compensate or neutralize a reactive torque generated by tapping the usable torque.

15 Claims, 9 Drawing Sheets

(56) References Cited

U.S. PATENT DOCUMENTS

| | | | |
|---|---|---|---|
| 2009/0066085 A1* | 3/2009 | Gray | 290/42 |
| 2009/0160191 A1* | 6/2009 | Beane | 290/53 |
| 2010/0058754 A1* | 3/2010 | Fong et al. | 60/506 |
| 2010/0171311 A1* | 7/2010 | Eckart | 290/53 |
| 2010/0225116 A1* | 9/2010 | Cuong | 290/53 |
| 2011/0006532 A1* | 1/2011 | Grey et al. | 290/53 |
| 2011/0057448 A1* | 3/2011 | Page | 290/53 |

FOREIGN PATENT DOCUMENTS

| | | |
|---|---|---|
| WO | 2007/072513 A1 | 6/2007 |
| WO | WO 2008004893 A1 * | 1/2008 |
| WO | WO 2009148296 A2 * | 12/2009 |
| WO | 2010/136100 A2 | 12/2010 |

* cited by examiner

WAVE POWER PLANT

This application is a 35 U.S.C. §371 National Stage Application of PCT/EP2010/007656, filed on Dec. 16, 2010, which claims the benefit of priority to Serial No. DE 10 2009 060 889.3, filed on Dec. 30, 2009 in Germany, the disclosures of which are incorporated herein by reference in their entirety.

BACKGROUND

The present disclosure relates to a wave power plant for generating electric power in offshore use and, in particular, to a wave power plant comprising a submersible platform.

A multiplicity of wave power plants is known from the prior art, which wave power plants are distinguished essentially according to their place of use, as to whether they are installed on the high sea (offshore), close to the coast or on the coast. Another distinction relates to the form in which the energy is drawn from the wave motion. For instance, buoys float on the water surface, so that a linear generator, for example, can be powered by a lifting and lowering motion of the buoy body. In another plant concept, the so-called "wave roller", a blade is placed on the seabed, which blade is tilted back and forth due to the motion of the water molecules. The kinetic energy of the blade is converted in a generator, for instance, into electric power. Finally, the concept of the "wave harrow" presents a machine by which energy from sea waves can be converted. In this case, a coupling body, for instance a blade, a rotor, a roll or such a rotation body is mounted in such a way that an orbital motion of the water molecules, as a consequence of the sea wave motion, is likewise converted into an orbital motion of the coupling body, which orbital motion can then be converted by a crank mechanism directly into a torque which can be used for power generation. The coupling body can be constituted by both a drag-type turbine and by a lift-type turbine, and by a combination of these said variants. By the use of hydraulic components and/or by means of a generator, for instance, the tapped usable torque can then be converted into electric current.

Such a plant is planned for offshore use, since here the energy density of waves is particularly high. In this field of application, rigid anchorage of a plant to the seabed is, however, very complex and expensive, if not even technically unfeasible, due to the likely large water depths. In the prior art there has therefore been proposed a so-called self-referencing housing or frame concept, in which a plurality of coupling bodies having the above construction and the above mounting are disposed in a common housing or structure. The housing or structure has a substantially horizontal longitudinal extent and is disposed beneath the water surface. The submersion depth can be varied by floats in or on the structure. Such a structure is hereinafter referred to as the submersible platform.

If the longitudinal extent of the submersible platform is sufficiently large to mount a plurality of coupling bodies thereon, then the forces acting on the submersible platform act, by virtue of the orbital motion of the water molecules as a consequence of the sea wave motion, in different directions and hereby largely offset one another. A largely still position of the submersible platform relative to the orbital motion of the water molecules is thereby obtained. The crank mechanisms of the coupling bodies can thus be supported on the largely static structure or submersible platform and deliver a torque.

At the same time, the generated torques of all individual coupling bodies have the same alignment, since all coupling bodies have the same direction of rotation. The torques generated by the coupling bodies at the crank drives can be added together, irrespective of their point of application on the submersible platform, if they act on the same rigid body, as is the case in the known wave power plants of this design. Due to the same orientation of all coupling body torques, according to the laws of kinetics a coupling body total torque which would set the overall position of the submersible platform in rotation in the rotational direction of the coupling bodies is thus obtained. It should here be pointed out that, without said torque tapping at the crank drives, the structure is not, of course, set in such rotational motion. For this reason, a dosing facility of the torque tapping which can adapt to the below-described measures for compensating the coupling body torque appears particularly advantageous.

The object of the present disclosure is therefore, by suitable means, to keep the wave power plant stable. One aim is, by this means, to generate a corresponding countertorque which keeps the wave power plant, and thus, in particular, also the submersible platform, in position. Another aim is the creation of a self-adjusting system, the countertorque of which varies in dependence on the applied torque. A further aim is, by a combination of said means, to prevent the inducement of a torque into the wave power plant, so that the plant can be kept in stable position. Only then would it be possible to productively tap the torques generated by the coupling bodies at the crank mechanisms and convert them, for instance, into electric power.

SUMMARY

The above-stated object and also the defined aims are achieved according to the disclosure by a wave power plant having the features of the disclosure. Advantageous refinements of the subject of the invention are here the subject of the subclaims.

The basic concept of the disclosure consists, essentially in equipping the wave power plant with a base platform and at least one coupling body, which latter is mounted rotatably, in particular with the performance of an orbital motion with predetermined motional direction, on the platform. In addition, an energy converter device, by which a torque usable for energy conversion can be tapped, i.e. tapped in the operating state and supported on the platform, is provided. Finally, a torque compensating device, by means of which a reaction torque of the platform, generated by the tapping/supporting of the usable torque, is counterbalanced or neutralized, is provided.

The coupling body can be, for example, a resistance body or an aerodynamically active body, such as, for example, a blade.

More concretely, according to one aspect of the disclosure, the wave power plant is equipped with a countertorque generating mechanism, which in dependence on the total torque (reaction torque), which is composed of the (tapped) individual torques generated by the coupling bodies and is referred to below as the (theoretically) usable torque, applies to the platform such countertorque that keeps this essentially in a stable (preferably horizontal) position.

Preferably, the countertorque generating mechanism according to the disclosure has for this purpose a device for the (asymmetrical) weight shifting or weight distribution, acting counter to the above-stated total torque (reaction moment), along the platform and/or the rack, such that the thereby adjustable weight distribution applies to the submersible platform or the rack a weight force, which (with due regard to the lever arms, necessarily produced by the weight distribution, with respect to the geometric center point) counteracts the usable torque. This could be realized, for instance, by at least one weight, which is movable in the longitudinal direction (perpendicularly to the bearing axle of the individual coupling bodies) or is asymmetrically fixed. Alternatively or additionally hereto, a (trimming) fluid accommodated in the submersible platform or in the rack can also however be pumped back and forth in the longitudinal direction of said submersible platform in order to achieve a weight shift about the geometric center point.

It is further advantageous (as already briefly described above) to equip the countertorque generating mechanism, alternatively or additionally to the weight distributing device, with a decentrally disposed buoyancy device (acting non-symmetrically in a direction perpendicular to the rotational axis of a bearing body), the buoyancy force of which upon the submersible platform (i.e. on the two platform end sides aligned parallel to the rotational axis of a coupling body) or upon the rack is preferably variable (controllable). In this respect, the buoyancy device constitutes a measure which acts additionally to the weight distributing device and which, according to its positioning, reinforces or offsets the effect of the weight distributing device.

It is also advantageous to fix (or anchor) the submersible platform to the seabed by a flexible cable having a specific weight, preferably a mooring chain, which in principle, upon an upward motion of the pivot point between the chain and the platform, is gradually raised from the seabed and thus correspondingly increases the weight force acting on the pivot point. A so-called catenary mooring fulfills these requirements, for instance. Such a mooring chain is consequently fixed to a point on the submersible platform which would rise in the case of a rotational motion of the submersible platform, whereby the weight force of the mooring chain (inclusive of the effective lever arm), acting counter to the rotational motion, would consequently increase (i.e. at a position distanced parallel to the rotational axis of a coupling body and counter to the direction of advance of the wave). In addition, the attachment of the mooring chain to a front end of the platform enables this to align itself in accordance with the direction of propagation of the wave such that the coupling bodies are flowed against substantially at right angles. Furthermore, the use of other mooring systems, such as, for example, taunt moorings or similar, is possible.

According to an alternative/supplementary aspect of the disclosure, the torque compensating device has at least one rack, which is mounted rotatably on the platform and on which, in turn, the at least one coupling body is mounted for an orbital motion and on which is disposed the countertorque generating mechanism, which, in dependence on the currently tapped usable torque and/or the current spatial position of the rack, applies to the rack such countertorque that keeps the rack substantially stable, so that the platform remains substantially torque-free. In this case, the reaction torque is hence already compensated ("spent" or "neutralized") before it is induced into the platform. Thus the platform does not necessarily any longer have to be equipped with an own countertorque generating mechanism.

In other words, the alternative/supplementary aspect provides a combination of a long, horizontally aligned frame/platform having at least one small vertical and self-adjusting frame/rack. This at least one rack with vertical basic alignment is mounted rotatably on the large horizontal frame. It has preferably (in the simplest case) at its upper end a buoyancy body and/or at its lower end a mass, the coupling body/bodies being held in an orbitally movable manner in the small frame. The torque pick-off via a gear mechanism and/or generator is supported on this small frame.

In the case of a torque pick-off at the coupling body, a reaction moment is induced into the small frame, which reaction moment leads to a tilting motion of the small frame about its rotational axis on the large frame (platform) until such time as the countertorque generated by the buoyancy body and/or the mass via the materializing lever produces an equilibrium of moments. In this case, no torque acts upon the platform. This is consequently kept stably in position.

Finally, an advantageous refinement of the disclosure provides to couple the submersible platform to a so-called "heave plate" or damper plate. In this case, advantage is taken of the fact that the water molecules in large water depth perform no, or a smaller orbital motion than water molecules close to the water surface. If, consequently, a damper plate located in greater water depth is coupled by a preferably rigid coupling element to the submersible platform located close to the water surface, said damper plate produces a stabilization of the submersible platform. The submersible platform can thus be built significantly shorter without being set unduly in rocking motions by the wave motion. This is advantageous, in particular, in relation to cost aspects.

BRIEF DESCRIPTION OF THE DRAWINGS

The disclosure is explained in greater detail below on the basis of preferred embodiments with reference to the accompanying figures.

DETAILED DESCRIPTION

Figure 1:
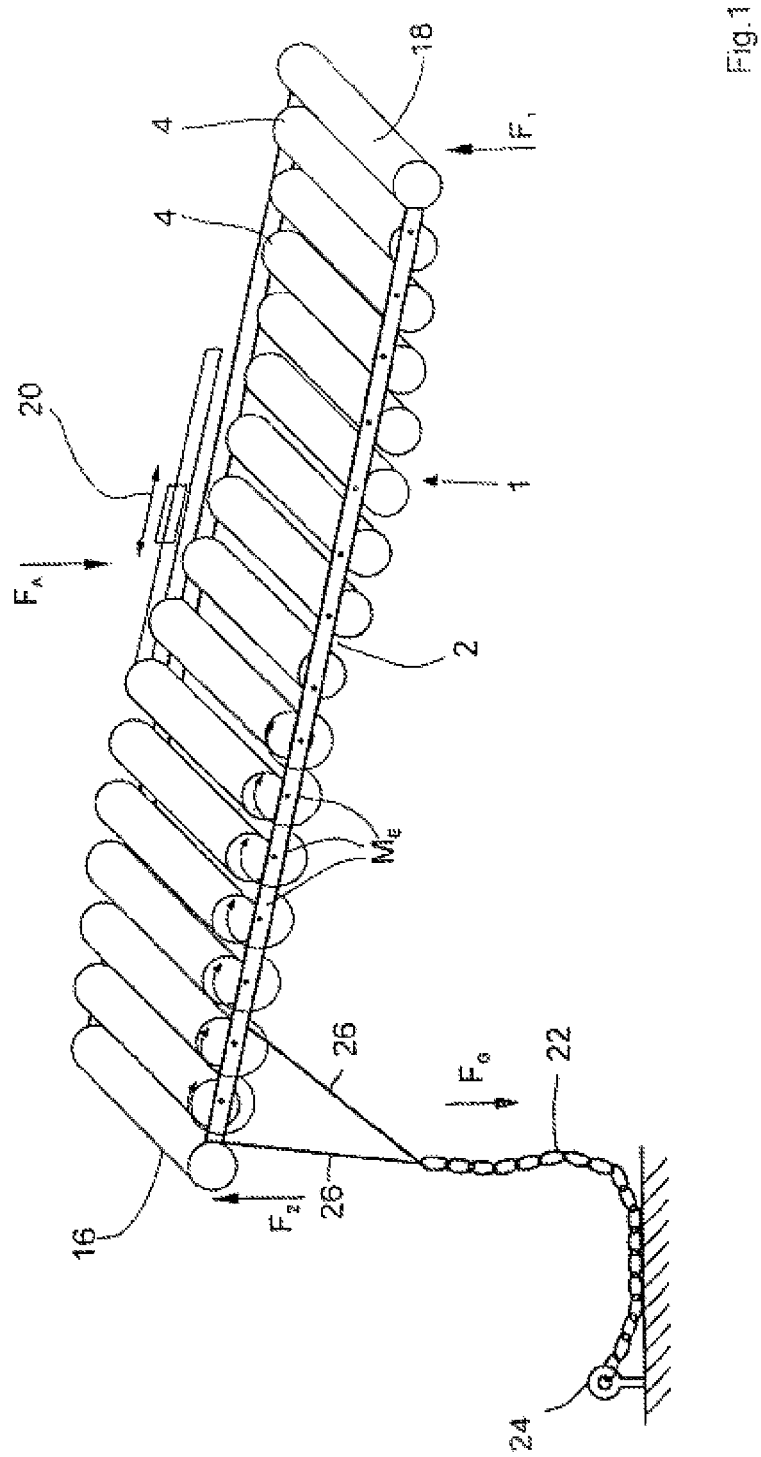
FIG. 1 shows a wave power plant comprising a submersible platform according to a preferred illustrative embodiment of the present disclosure.
Figure 2:
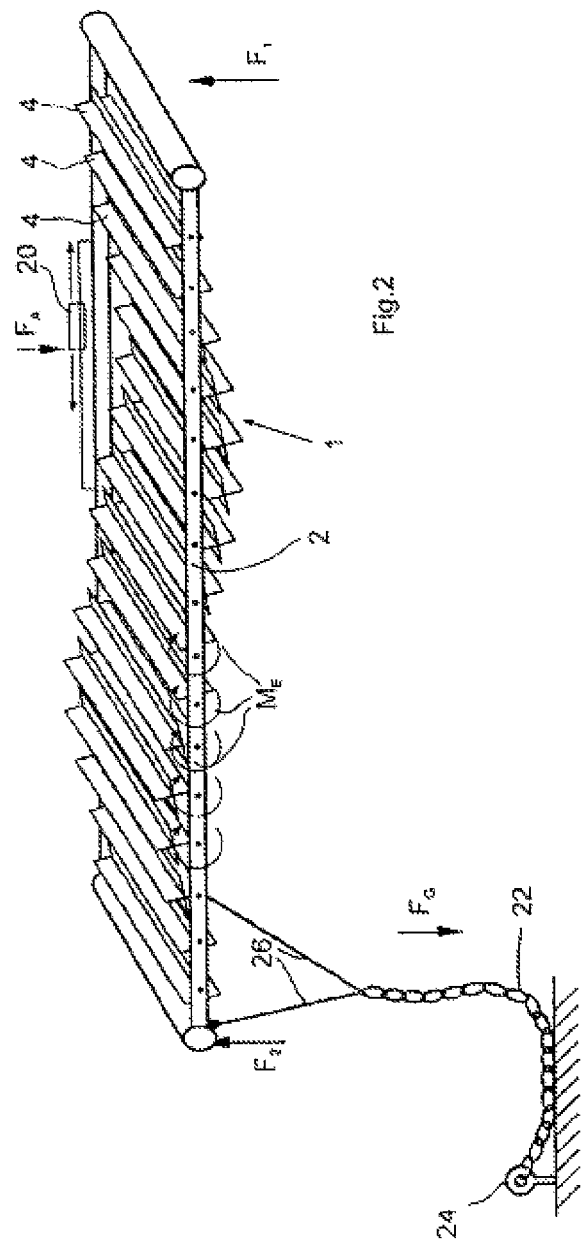
FIG. 2 shows the wave power plant according to FIG. 1 comprising coupling bodies configured alternatively to FIG. 1.

According to FIG. 1 or 2, the wave power plant of the first preferred illustrative embodiment of the disclosure has a submersible platform 1, which in the present case consists of two parallel-spaced, longitudinally extending rails or beams 2

(also beam-shaped lattice frames), which at least at their respective ends (or else at middle portions) are connected by transverse bars/struts to form a structure (lattice frame). Between the rails 2 are mounted in parallel spacing, broadly over the whole of the rail length, (preferably evenly spaced) coupling bodies 4, as are configured according to FIG. 3 on the basis of a coupling body represented by way of example.

Figure 3:
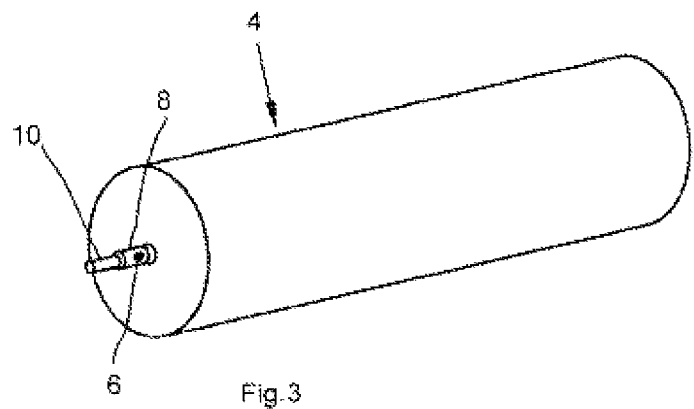
FIG. 3 shows a coupling body as is used in the wave power plant according to FIG. 1.

According to this FIG. 3, each coupling body 4 hence consists of a roller or roll, which extends substantially over the entire parallel distance between the two rails 2 and which in the middle has a bearing axle 6. The bearing axle 6 is mounted or fitted on two lever arms 8, which are disposed on the respective end faces of the roll 4. To one of the ends of the lever 8 lying opposite the bearing axle 6 of the roll 4 is fixed a mounting axle 10, which is respectively inserted rotatably in a bearing bush of the rail 2. In this way, each coupling body or each roll 4, according to the above construction, can perform at least an orbital motion about the mounting axle 10 and thus drive the crank drive, comprising lever 8 and mounting axle 10, for a torque pick-off. The length of the lever arm can be adjustable in order to be able to adjust the wave power plant optimally to different wave heights. The coupling bodies preferably have a neutral or almost neutral buoyancy.

Figure 4:
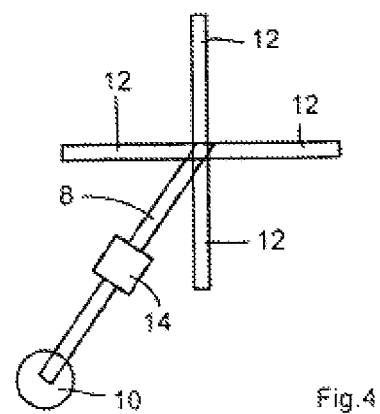
FIG. 4 shows a coupling body as is used in the wave power plant according to FIG. 2.

Alternatively to the above-described coupling body design, the coupling body 4 can be configured, for example, also in the form of a cross geometry according to FIG. 4. In this case, the (axially symmetric) cross geometry of a coupling body 4 consists of four blades 12, which extend over the parallel spacing of the two rails 2 and which on their respectively one longitudinal side are fixed to a hub at an angular interval of respectively 90°. The hub (corresponds to the bearing axle 6 of the above-described roll) is likewise mounted on one end of the lever 8, on whose other end is disposed the mounting axle 10 for the orbitally movable mounting of the propeller-shaped coupling body 4 on the bearing eyes of the rails 2. In addition, according to FIG. 4, a length adjusting unit 14, by means of which the orbit of the coupling bodies can be altered, is provided on each lever 8.

As can further be seen from FIGS. 1 and 2, at least on the respectively longitudinally spaced end portions of the submersible platform 1 (at a distance directed perpendicular to the mounting axle 10), buoyancy bodies in the form of ballast tanks 16, 18, or similar air-fillable containers are disposed, wherein at least one buoyancy body on that longitudinal end of the submersible platform which lies opposite the mooring can, where necessary, be sufficient for the working of the plant. Moreover, the buoyancy bodies can be arranged such that no shadow effects arise. For instance, two or more buoyancy bodies can accordingly be fixed to the side of the platform. Alternatively, a multiplicity of ballast tanks can also however be arranged along the submersible platform. Both ballast tanks or balloons 16, 18 provided in the present illustrative embodiment are preferably fluidically connected to an air compressor device (not further represented), by which the ballast tanks 16, 18 can further preferably be individually filled with compressed air (with corresponding displacement of water) in order hereby to selectively generate different (variable) buoyancy forces at the longitudinal ends of the submersible platform 1. Apart from ballast tanks, volume-variable cushions, which can be filled with compressed air, are also conceivable. Advantage over rigid tanks: the air or another fluid can be pumped back and forth.

Furthermore, the submersible platform 1 is alternatively or additionally equipped in the longitudinal direction of the platform 1 with a weight shifting device. According to FIG. 1, this can consist of a balance weight 20, which is movable along the rails 2 and which is preferably disposed beneath and midway between the two rails 2, or on each rail 2, and can be moved back and forth, for instance, by means of a rotatable spindle extending along the rails 2, or by a cylinder or an own drive. The movable balance weight can also however be constituted by a (trimming) fluid, which is bunkered in the submersible platform and is pumped back and forth along the submersible platform, for instance by means of a fluid pump.

Finally, the submersible platform 1 according to the disclosure is fixed or anchored to the bottom (seabed) by at least one flexible cable. In the present case, the flexible cable consists of a mooring chain 22 having a predetermined excess length, which is fixed to a holding device 24 (for instance a concrete block or an anchor) on the bottom. The free end of the mooring chain 22 is fixed by cable sections or ropes 26 to a longitudinal end of the submersible platform 1 (preferably opposite to the at least one buoyancy body). Alternatively, the mooring chain can also be fastened directly to the submersible platform. In addition, other mooring variants, such as, for example, a taunt mooring, are possible.

The working method of the wave power plant according to the disclosure is described below.

As a result of the plurality of coupling bodies 4 (at least one coupling body is already sufficient for the functionality of the plant), in the represented wave power plant a torque $M_e$ is in the present case respectively transmitted in the clockwise direction into the submersible platform 1, in which case the plant according to FIGS. 1 and 2 is flowed over from left to right, i.e. the direction of propagation of the wave is oriented substantially in the direction of the longitudinal extent of the plant. The weight force $F_g$ of the mooring chain 22 here leads, together with the non-symmetrically filled buoyancy bodies/ballast tanks 16, 18, to a torque which is directed oppositely to the clockwise direction. That is to say, the buoyancy bodies/ballast tanks 16, 18 are filled with air such that, if no torque were tapped from the coupling bodies, the submersible platform would pivot counterclockwise from the horizontal into a vertical alignment.

This torque (counterclockwise) can be adjusted by the non-uniform (air) filling of the buoyancy bodies/ballast tanks 16 and 18 such that the total sum of the torques gives zero. In this case, the entire plant remains stable, preferably in horizontal alignment, as is represented in FIGS. 1 and 2. By adjusting the symmetry/non-symmetry of the buoyancy, the active torque can consequently be adapted to various operating states which can arise from different wave heights and/or submersion depths and/or tapped torques.

At this point, it should be pointed out that the weight force $F_g$ of the mooring chain 22 changes in dependence on its chain length hanging from the submersible platform 1. That is to say that the mooring chain 22 independently applies a force $F_g$ which dynamically opposes a floating motion of the submersible platform 1, whereby the platform 1 is kept in horizontal alignment. It is also possible to counteract such rotatory floating motions of the submersible platform 1 by dynamic filling and emptying of the individual buoyancy bodies 16, 18.

Additionally or alternatively to the buoyancy bodies 16, 18, a countertorque acting counter to the sum of the individual torques $M_e$ can also be achieved by a (fixed) non-symmetrical weight distribution with respect to the geometric center point of the wave power plant, to be precise with a high plant weight on that side of the submersible platform 1 which is facing the incoming wave (that longitudinal side of the submersible platform 1 to which also the mooring chain 22 is fixed) and with a low plant weight on that side of the submersible platform 1 which is facing away from the incoming wave. In principle, the plant weight is not however adaptable to different operating states unless the plant weight is altered in terms of the center of gravity by the balance weight 20 displaceable along the rails 2 and/or by the pumpable trimming fluid.

In conclusion of the above description of the first illustrative embodiment of the disclosure, it should be pointed out that the four aforementioned measures, namely shifting of the center of gravity of the plant weight by dynamic lengthening of the mooring chain part 22 hanging from the platform, shifting of the center of gravity of the wave power plant by longitudinal displacement of the balance weight 20 and/or by recirculation of trimming fluid along the submersible platform, non-symmetrical buoyancy by individual (gas) filling of buoyancy bodies/ballast tanks 16, 18 fixed at least to one of the longitudinally spaced ends of the submersible platform 1, and active (static) non-symmetrical weight distribution of the wave power plant in the longitudinal direction of the submersible platform 1, can be realized individually, or in any chosen mutual combination, in the wave power plant according to the disclosure in order to be able to keep this in position in accordance with its predetermined use. Nor are the coupling bodies, represented in greater detail in FIGS. 3 and 4, limited to the shown embodiments, but rather other designs for a drag-type turbine and/or buoyancy-type turbine (or a combination of these), which generate a common rotational direction and a torque aligned in the same direction, can be adopted.

Figure 5:
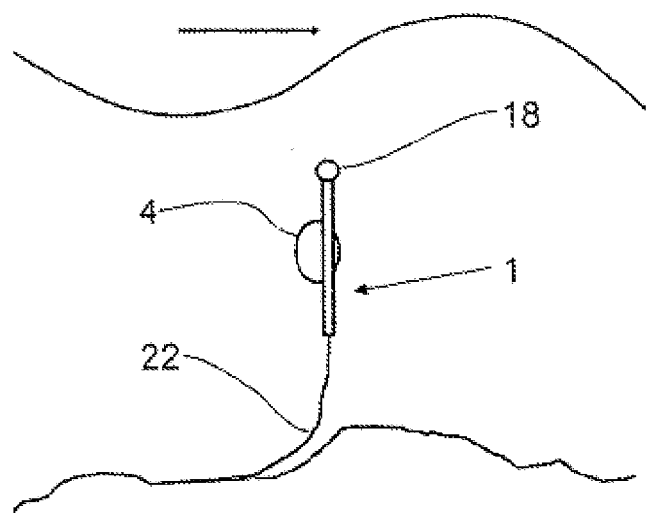
FIG. 5 shows a wave power plant (in lateral representation) comprising a self-adjusting submersible platform, according to a further illustrative embodiment of the present disclosure in the installed (basic) state.
Figure 6:
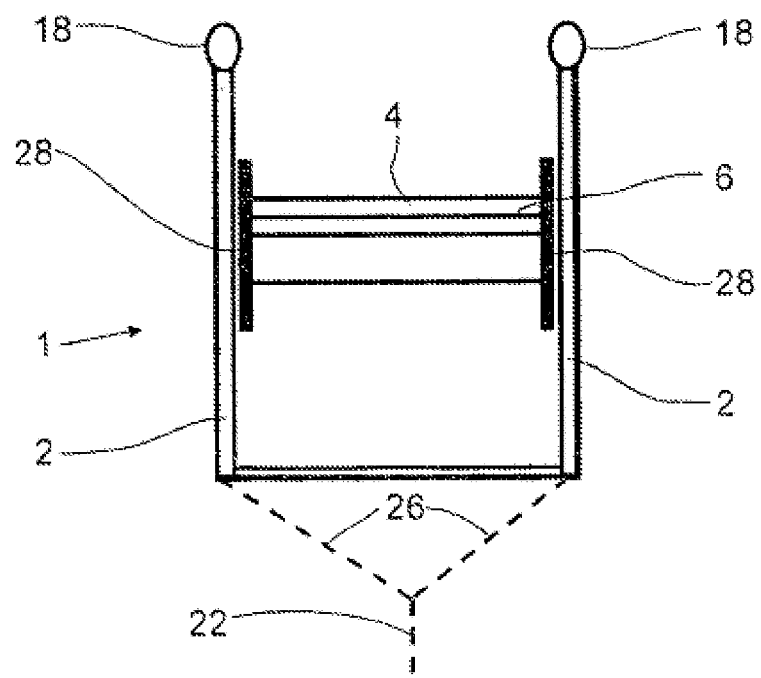
FIG. 6 shows the wave power plant of FIG. 5 in front view, comprising a coupling body having a type of "winglets" for reducing induced resistances (or turbulent wakes) and for achieving a self-alignment of the plant.
Figure 7:
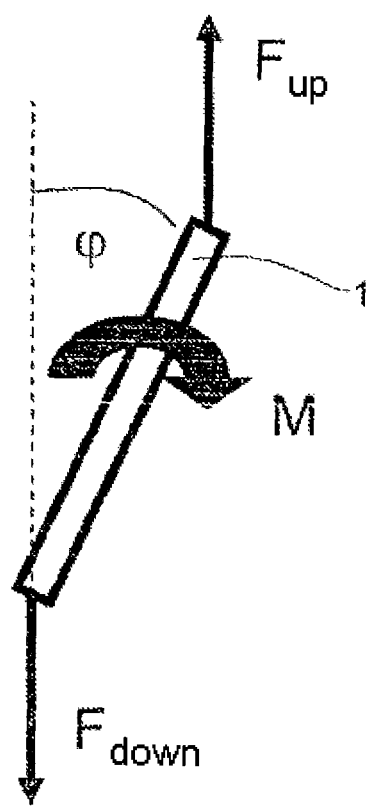
FIG. 7 shows a basic representation of the submersible platform according to FIG. 5, with illustrated moments and forces for an assumed operating state.

A further illustrative embodiment of the disclosure is represented in FIGS. 5 to 7.

In this case also, the wave power plant consists of a submersible platform 1 having two longitudinally spaced, parallel-running rails 2 (or lattice frame constructions), which are mechanically connected to each other on at least one (axial) end portion by a transverse beam to form a structure (lattice frame), and on the preferably opposite end portion of which are disposed at least one, in the present case two buoyancy bodies in the form of ballast tanks or volume-variable cushions.

Disposed in an orbitally rotatable manner between the rails 2 is at least one coupling body 4, the design structure of which corresponds to the coupling bodies described with respect to the first illustrative embodiment. At this point, it should also be pointed out that also a plurality of coupling bodies 4 can be arranged in parallel spacing between the two rails 2.

Alternatively to two rails with coupling bodies arranged in-between, a rail in the form of a middle rib with coupling bodies disposed on both sides can also be provided.

The (each) coupling body 4 can additionally have on its end sides (end faces) a flow guiding element (a type of winglet) 28, preferably in the form of an elliptical disk (does not necessarily have to be circular), which is aligned substantially perpendicular to the coupling body longitudinal axis (bearing axle 6). These circular disks have the task of avoiding a situation in which the water flow "slides off" via the end faces of the coupling bodies and thus of reducing the induced drag (turbulent wake) on the coupling bodies. The efficiency of the wave power plant can thus be increased. At this point, it should further be pointed out that these flow guiding elements 28 are usable also with the coupling bodies of the first illustrative embodiment and, in general, with any coupling body shape.

The coupling body (bodies) 4 is (are) articulately attached to the rails 2 by levers in order to be able to perform an orbital motion about the pivot points. Alternatively, they can however be fastened (for instance welded) eccentrically to the circular disks, so that, if the circular disks are mounted centrally, a corresponding lever arm and an orbital mobility are obtained.

Finally, from an axial end portion of the rails 2, preferably that end portion on which the transverse beam (transverse strut) is installed between the rails 2, is hung a mooring chain 22, which is fastened by two ropes or cables 26 to the two ends of the two rails 2 or to the transverse beam and is anchored to the bottom.

The working method of the wave power plant according to the second preferred illustrative embodiment of the disclosure is described below:

In the inventive embodiment, the frame of the wave power plant is disposed, in a state without wave motion, broadly perpendicularly, closely beneath the water surface. As is represented in FIG. 5, the at least one floating or buoyancy body/ballast tank 18 is disposed on the now upper longitudinal end of the submersible platform 1, whereas the, in this position, lower longitudinal end of the submersible platform 1 is fastened to the seabed by the mooring 22, for instance a catenary mooring, taunt mooring or tension leg mooring. In the present case, the at least one coupling body 4 is placed roughly halfway up between the rails 2, yet an arrangement at some other position is also conceivable. The components of the wave power plant have all in all a neutral buoyancy, i.e. the buoyancy body or bodies/ballast tank(s) 18 counterbalance the weight force of the platform 1, of the coupling bodies and of the mooring 22 and keep the plant at a predetermined water depth. The coupling body, in itself, already has a largely neutral buoyancy.

If the coupling body/bodies 4 are now set in orbital motion, by a wave motion, then, when torque is tapped at the crank mechanisms, the corresponding total torque is transmitted into the frame. This inevitably leads to a tilting tendency of the frame 1 (in the rotational direction of the coupling bodies), as has been described also in connection with the first illustrative embodiment of the disclosure. Given a wave which, according to FIG. 5, advances from left to right, the platform 1 tilts from left to right. The forces which, as a result of the mooring 22 and the buoyancy bodies/ballast tanks 18, act on the frame 1 produce a torque, however, which is directed counter to the torque induced by the wave motion and which is dependent on the degree of tilting (see, in particular, FIG. 7). With increasing tilting, this torque rises, so that, at a 90° tilt (platform 1 is now horizontally aligned), the countertorque maximum is reached.

If the buoyancy body or bodies/ballast tanks 18 are designed such that the maximally occurring plant tilt is reached at a tilt less than or equal to 90°, then the plant, in dependence on the tapped torque, will always swing back and forth between an angle of 0° to 90°. The magnitude of superimposed oscillations of the total system due to the orbital motion of the water molecules, which orbital motion acts also on the frame, is here estimated to be relatively small and is therefore likely to have no significant influence on the equalizing motions of the frame 1.

As an alternative embodiment to the above-described second illustrative embodiment of the disclosure, the mooring 22 is likewise fastened to the upper platform end or a middle portion (together with the buoyancy bodies/ballast tanks 18), whereas to the lower longitudinal end there is fitted an additional weight (not shown), which, upon deflection, gives rise to a countertorque. Alternatively or additionally, the lower longitudinal end can also be realized with a greater density. For these cases, a change in the weight force of the mooring is not important. The torque changes also in the event of constant mooring force, as a result of deflection of the weight and/or of the buoyancy body.

The proposed torque balancing concept works particularly advantageously if the torque tapped at the plant is constant. The plant will then adjust essentially at a constant angle relative to the vertical. Via the adaptation of the buoyancy bodies/ballast tanks 18, an optimal operating point for such a quasi-stationary case is also easily adjustable. Yet even if the torque is not constant, no abrupt changes of angle are obtained, so that, if the 90° threshold relative to the vertical is neared, an adaptation of the buoyancy body/ballast tank 18 can be successfully achieved in order to avoid excess swinging of the frame 1.

A fundamental advantage of the plant which is self-adjusting in the manner described above consists in the fact that, given high waves with potentially large torques and a correspondingly strong lateral deflection of the plant, a greater submersion depth of the coupling body 4, with correspondingly smaller orbital velocities and thus lower energy input, automatically arises due to the tilting of the plant. This behavior therefore offers a certain overload protection.

Furthermore, an important point for the functionality of the proposed concepts is a self-alignment of the frame 1 relative to the incident flow, so that the coupling body/bodies 4 are essentially always flowed against transversely to their bearing axle 6. Such self-alignment can be improved, for instance, by additional elements, the flow resistance of which is heavily direction-dependent and which are arranged in the plant such that the smallest resistance is obtained if the coupling body 4 is transversely flowed against. For instance, said additional elements could be constituted by the above-described face plates/disks on both ends of the coupling body 4, which can axially protrude clearly beyond the coupling beam 4 and are dimensioned such that they can assume this additional function. In addition, between these two face disks, yet further disks with the same spatial orientation can be fitted to the coupling bodies. This leads to significantly enhanced self-alignment and additionally to higher rigidity of the coupling body system.

The configuration of the wave power plant according to the second preferred illustrative embodiment of the disclosure makes it possible to provide a system which is self-adjusting with respect to countertorque generation and which passively makes do without intervening adjustment. A particularly robust, unobtrusive system, which, in particular, can also be designed relatively small, is thereby achieved. Ideally, the system can make do with just one coupling element, wherein, for example, both drag-type turbines, as well as buoyancy-type turbines, and a combination of the two, are here possible.

Figure 8:
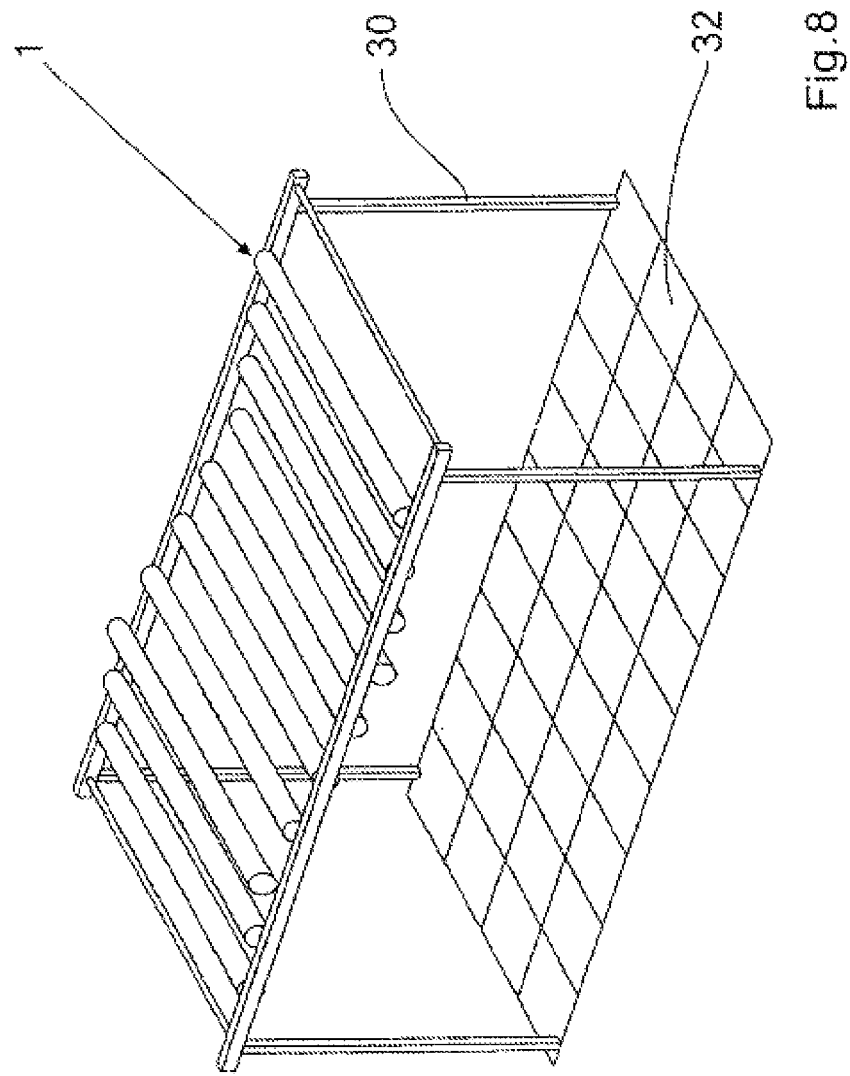
FIG. 8 shows a basic representation of a, for instance, horizontally aligned submersible platform with connected "heave plate"
Figure 9:
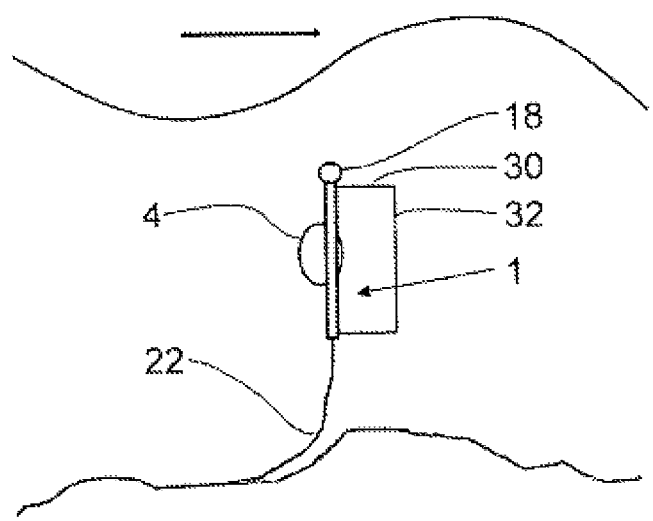
FIG. 9 shows a basic representation of the submersible platform according to FIG. 5 with connected "heave plate"

Finally, reference should also be made to the particular design principle for a wave power plant having a submersible platform 1 according to FIGS. 8 and 9.

In principle, the submersible platform or the frame 1, in particular according to the first preferred illustrative embodiment of the disclosure, can have a longitudinal extent of up to several 100 m. It is here advantageous to tailor the length of the submersible platform 1 to the likely wave lengths such that it extends preferably over at least two wave lengths. This can have the effect that the forces acting directly thereon are counterbalanced and therefore the submersible platform 1 lies relatively still in the water. The problem is here, however, the inner stability of the platform 1, which must also withstand extreme weather influences, such as storms. Large platform lengths thus lead to very high structural costs, for which reason, according to the disclosure, platforms with length << (much smaller than) two wave lengths are considered advantageous.

At this point, it should also be pointed out that water molecules close to the water surface move more vigorously than in greater water depths. The disclosure now utilizes this fact in two respects:

On the one hand, the submersible platform 1 according to the disclosure is kept in water depths close to the water surface in order to apply as high external forces as possible to the coupling bodies 4 and thus boost the economy of the plant. In the case of storms or other events which could lead to an overload, a descent of the submersible platform 1 into greater water depths with lesser fluid motion can be provided according to the disclosure. On the other hand, a so-called damping plate 32 is used to stabilize the platform 1, which damping plate is disposed in greater water depths and is connected to the submersible platform 1 by a coupling device 30.

A damping plate 32 is a planar structure having a highest possible flow resistance. It can also be equipped with a breached surface (holed, perforated, grilled surface, etc.). This damper plate 32 is aligned horizontally (see FIG. 8) and/or vertically (see. FIG. 9) in the water and thus forms a force application surface for the water. The coupling device 30 is preferably rigid and is formed, for instance, by pillars which extend perpendicularly to the platform 1 and which are fixed on the end to the submersible platform 1 and to the damper plate 32 so as to be able to transmit tensile and compressive forces. The damper plate 32 which is thus connected to the submersible platform 1 and which resides at greater water depth thus dampingly opposes a motion of the submersible platform 1 and keeps this in position. The submersible platform 1 can thus be reduced in its length, which leads to corresponding cost savings in respect of the submersible platform. In the extreme case, a single coupling body can be combined with such a damper plate, though the dimensions of the damper plate and of the submersible platform do not have to tally, as represented. Moreover, it is possible to use a plurality of separate damper plates, respectively connected to the submersible platform. In addition, at variance with the representation, a different alignment of the damping plate is also possible, for example largely perpendicularly, or a combination of differently aligned damping plates in order to be able to support forces/moments in a different direction.

The above-described illustrative embodiments basically relate to plants in which a (reaction) torque induced into the platform 1 by the coupling bodies 4 in the course of the energy conversion, as a result of selected weight and/or buoyancy distribution along the platform 1, is opposed by a compensating torque or countertorque in order to keep the platform 1 in a certain spatial position with respect to the gravitational force vector and balance it out. Accordingly, all previous illustrative embodiments are founded on the basic principle of producing a torque equilibrium at the platform 1.

At the same time, there is also in principle, however, the possibility of forestalling the induction of a torque as a result of the energy conversion at the at least one coupling body 4, i.e. of "using up" (compensating) the resultant reaction moment before it is induced into the platform 1. This is achieved by combining the above-described first embodiment of the disclosure according to FIG. 1 with the further embodiment according to FIG. 5, though all further auxiliary measures according to the other illustrative embodiments can, of course, likewise be applied.

Figure 10:
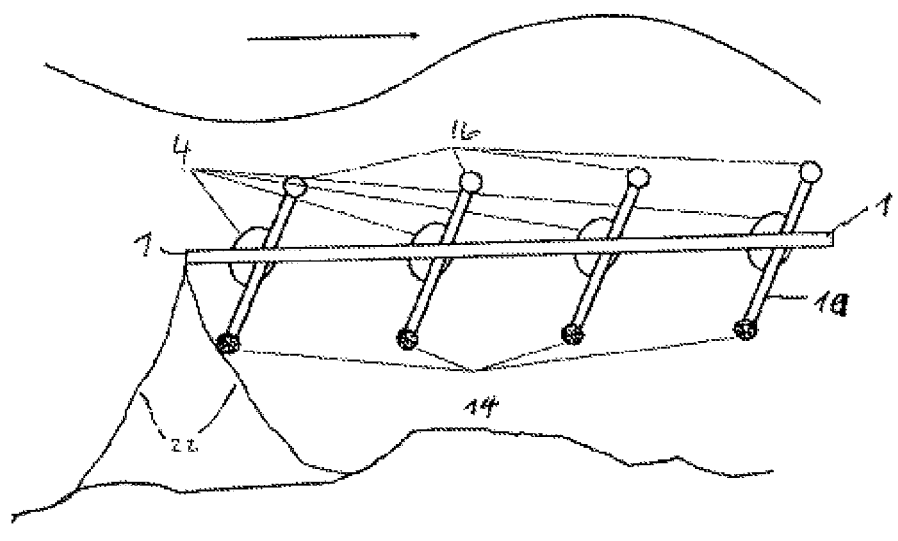
FIG. 10 shows a wave power plant according to yet another illustrative embodiment of the disclosure, in which the working principles of the wave power plants according to FIGS. 1 and 5 are combined.

In other words, it is provided according to FIG. 10 to mount rotatably on the platform 1 according to FIG. 1, instead of the coupling bodies which are shown there, at least one (or a plurality of longitudinally spaced) rack(s) 1a, as is disclosed, for instance, in FIG. 5 on the basis of the platform which is shown there. That is to say, in the platform 1 (according to FIG. 1) are rotatably mounted, in longitudinal spacing, racks 1a (corresponding to small platforms 1), essentially consisting of two longitudinal rails, which are connected by transverse beams to form a lattice frame and on which the coupling body/bodies 4 are mounted for an orbital motion relative to the rack 1a. Here too, two longitudinal rails do not have to be used. In principle, one is sufficient. This could be arranged in the middle with two coupling bodies, yet one lateral rail is also sufficient.

The thus constructed rack 1a has at one longitudinal end one or more buoyancy bodies 16 and at the opposite longitudinal end one or more weights (masses) 14, so that the rack 1a is aligned substantially vertically and thus perpendicularly to the (large) platform 1. However, a combination of weight and buoyancy is not absolutely necessary. A weight or a buoyancy would also suffice.

If a (useful) torque is now tapped at the rack 1a mounted rotatably on the platform 1 (corresponds to the platform 1 according to FIG. 5 in downsized version), then this leads to a tilting of the rack 1a relative to the gravitational force vector (as represented in FIG. 7) about the rotational axis on the platform 1, wherein the continuing tilting motion, as a result of the buoyancy force and the down force, as well as the respectively growing length of the resultant lever arm, leads to a rising countertorque at the rack 1a. As a result, the induced (reaction) torque is captured ("spent") in the rotatable rack 1a and is not transmitted to the substantially horizontally aligned base frame (platform 1). The reaction moment is thus "spent" or compensated by the countertorque 1a already in the rack, before it is induced into the platform 1.

According to FIG. 10, the rotatable rack 1a, in this particular embodiment, is mounted in its middle region on the platform 1. In one modification, the at least one rotatable rack 1a is mounted in the region of its lower end (in the region of its auxiliary weight 14) on the horizontal platform 1 (in this case, no weight would be placed here). Another modification provides to mount the at least one rack 1a rotatably in the region of its upper end (in the region of its buoyancy bodies 16) on the horizontal platform 1 (in this case without buoyancy bodies). In all described modifications, the total construction possesses, however, a substantially neutral overall buoyancy.

In order to keep the platform 1 as stable as possible in the water, it can be designed, given large extent, with high Cw values (this applies also to FIGS. 1 and 2). As a result, forces are transmitted into the total plant not only via the coupling bodies 4, but also via the horizontal frame 1 (platform 1). This has the advantage, given a fixed number of coupling bodies 4, that, if the platform length is adequate, a stable platform position arises irrespective of the current (sea) wave length, since a substantial share of the forces is transmitted through the frame.

Figure 11:
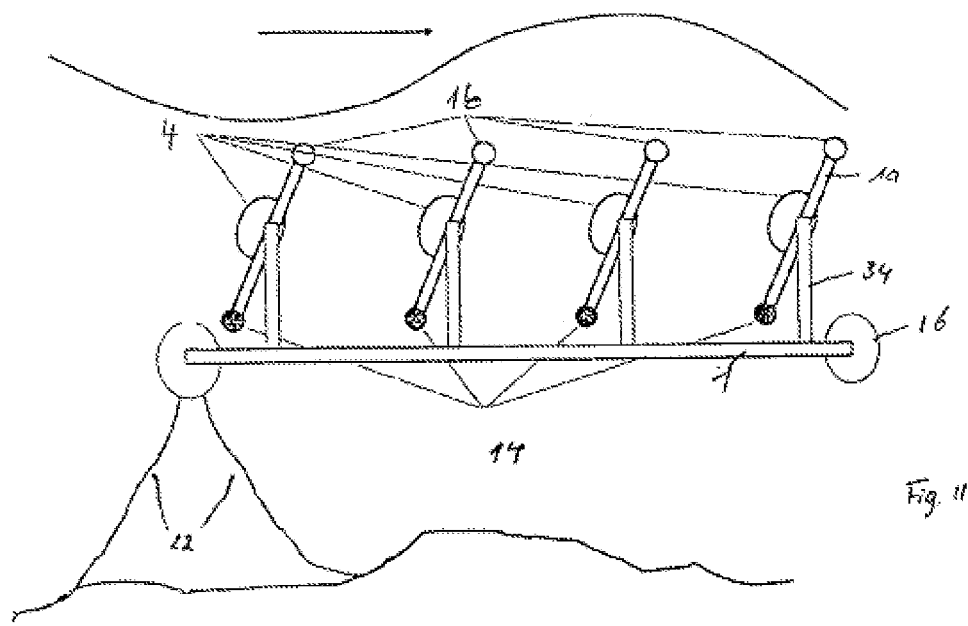
FIGS. 11 and 12 show design modifications of the wave power plant according to FIG. 10, possibly also in combination with FIG. 8.
Figure 12:
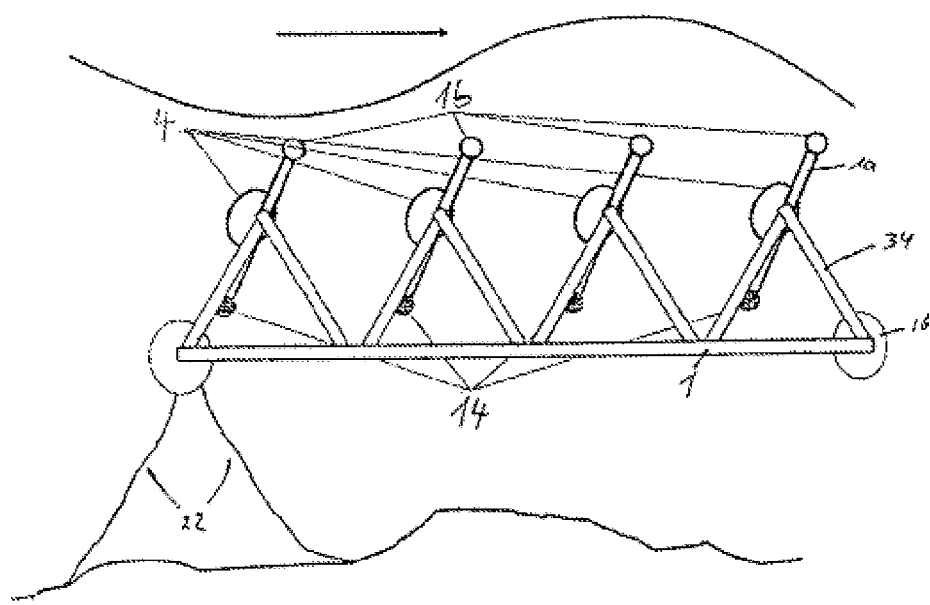

Alternatively, the configuration of the horizontal frame (platform) 1 as a heave plate having upwardly projecting suspension mountings 34 for the vertical racks 1a is also possible, as is represented in FIGS. 11 and 12 (is not necessarily a damping plate, can also simply be a more deeply arranged frame). Hence the suspension mountings 34 can be formed by singular support struts (see FIG. 11) or respectively by a framework or bipod (see FIG. 12). Still greater plant stability can thereby be achieved, since the center of gravity of the plant ends up below the pivot axes of the racks 1a.

A rotatable mounting of the vertical racks 1a not only about the horizontal, but also about the vertical axis is also conceivable in this case. In this event, it would no longer be necessary for the horizontal frame (platform) 1 configured as a heave plate to align itself relative to the incident flow, as has been described above. The alignment could then be realized by the also vertically rotatably mounted rack 1a. Alternatively, a configuration of the platform/racks using compression members and cable stays is also conceivable.

REFERENCE SYMBOL LIST 1 platform
1a rack (small platform)
2 rails
4 coupling body
6 bearing axle
8 lever
100 rotational axis or mounting axle
12 blade
14 weight
16, 18 buoyancy bodies
20 sliding weight
22 mooring chain
24 anchorage
26 ropes
28 flow guiding element
30 coupling element
32 damping plate
34 suspension mountings

The invention claimed is:

1. Wave power plant for use in a body of water comprising:
   a platform;
   at least one coupling body mounted relative to the platform to receive wave motion of the body of water;
   an energy converter device connected between the coupling body and the platform and configured to generate a usable torque tapped from movement of the coupling body in an operating state;
   a torque compensating device which includes at least one rack mounted rotatably on the platform, wherein said at least one coupling body is mounted on said rack and moves in orbital motion relative to said rack; and
   a countertorque generating mechanism mounted on said rack, configured to apply a countertorque to said rack in response to one or more of the usable tapped torque and spatial position of said rack to retain said rack substantially stable, such that the platform remains substantially torque-free.

2. The wave power plant as claimed in claim 1, wherein the countertorque generating mechanism is configured to modify the weight distribution along one or more of the platform and the rack such that the weight distribution counteracts the reaction torque.

3. The wave power plant as claimed in claim 1, wherein the countertorque generating mechanism provides a non-symmetrical buoyancy along the platform or the rack such that the buoyancy counteracts the currently tapped usable torque.

4. The wave power plant as claimed in claim 1, wherein the countertorque generating mechanism has at least one sliding weight, movably mounted on the platform or the rack for movement-perpendicularly to the orbital motional axis of the at least one coupling body.

5. The wave power plant as claimed in claim 1, wherein the platform has a geometric center point, and wherein:
   the platform has an asymmetrical, fixed weight distribution/buoyancy force distribution perpendicular to the axis of orbital motion of said at least one coupling body, and/or the rack has with respect to its rotational axis on the platform a geometrical, fixed weight distribution or buoyancy force distribution in its longitudinal direction.

6. The wave power plant as claimed in claim 1, further comprising at least one flow guiding element, which is disposed on end faces of the at least one coupling body and which produces an alignment of the platform or the rack in the direction of advance of the wave such that the direction of propagation of the wave is oriented substantially perpendicular to a bearing axle.

7. The wave power plant as claimed in claim 1, further comprising at least one damper plate, which is connected to the platform or the rack by a rigid coupling device in order to damp motions of the platform.

8. The wave power plant of claim 1, wherein the countertorque generating mechanism includes a trimming fluid which is accommodated in a fluid guiding system and is configured to be pumped back and forth in the longitudinal direction of the platform or the rack.

9. The wave power plant as claimed in claim 3, wherein the countertorque generating mechanism has at least one buoyancy body/ballast tank, said at least one buoyancy body/ballast tank disposed or configured on the platform or the rack decentrally to the center of gravity of the platform or the rack.

10. The wave power plant as claimed in claim 3, wherein the countertorque generating mechanism has a number of buoyancy bodies/ballast tanks, said number of buoyancy bodies/ballast tanks disposed or configured on two end portions of the platform or the rack, said end portions being spaced apart one opposite the other perpendicularly to the orbital motional axis of the coupling body and at least one of said buoyancy bodies/ballast tanks on said end portions having a variable buoyancy.

11. The wave power plant as claimed in claim 9, wherein the at least one buoyancy body/ballast tank is volume-variable or floodable.

12. Wave power plant for use in a body of water, comprising:
a platform;
at least one coupling body mounted rotatably on the platform to receive wave motion of the body of water;
an energy converter device connected between the coupling body and the platform and configured to generate a usable torque tapped from movement of the coupling body in an operating state; and
a torque compensating device separate from the at least one coupling body configured to counterbalance a reaction torque of the platform generated in reaction to the usable torque, and including a countertorque generating mechanism including at least one buoyancy body disposed on a longitudinal end portion of the platform and a mooring chain disposed on an opposite longitudinal end portion of the platform, and wherein the at least one buoyancy body is set such that the obtained buoyancy, given a horizontal alignment of the platform together with the mooring chain and/or a non-symmetrical weight distribution along the platform generates a total countertorque which is roughly equal to the usable torque tapped from the at least one coupling body.

13. Wave power plant for use in a body of water, comprising:
a platform;
at least one coupling body mounted rotatably on the platform to receive wave motion of the body of water;
an energy converter device connected between the coupling body and the platform and configured to generate a usable torque tapped from movement of the coupling body in an operating state; and
a torque compensating device separate from the at least one coupling body configured to counterbalance a reaction torque of the platform generated in reaction to the usable torque,
wherein the energy converter device includes a lever rotatably mounting the coupling body relative to the platform, the lever coupled to and driving an axle for generating a usable torque, the energy converter device further including an adjustment unit for adjusting the length of the lever to vary the usable torque in order to adapt the usable torque to the sum of the currently obtaining compensating moments.

14. The wave power plant as claimed in claim 13, wherein the torque compensating device includes a countertorque generating mechanism configured to apply a countertorque to the platform in dependence on one or more of the currently tapped usable torque and a current spatial position of the platform, such that the platform remains essentially stable.

15. The wave power plant as claimed in claim 14, wherein the countertorque generating mechanism has a mooring chain fixed to the platform decentrally to the center of gravity of the wave power plant.

* * * * *